(12) United States Patent
Pletka et al.

(10) Patent No.: US 8,245,298 B2
(45) Date of Patent: Aug. 14, 2012

(54) PORT SCANNING METHOD AND DEVICE, PORT SCANNING DETECTION METHOD AND DEVICE, PORT SCANNING SYSTEM, COMPUTER PROGRAM AND COMPUTER PROGRAM PRODUCT

(75) Inventors: Roman A. Pletka, Horgen (CH); Marcel Waldvogel, Stein am Rhein (CH)

(73) Assignee: International Business Machines Corporation, Armonk, NY (US)

( * ) Notice: Subject to any disclaimer, the term of this patent is extended or adjusted under 35 U.S.C. 154(b) by 1357 days.

(21) Appl. No.: 11/465,112

(22) Filed: Aug. 16, 2006

(65) Prior Publication Data

US 2007/0044155 A1  Feb. 22, 2007

(30) Foreign Application Priority Data

Aug. 17, 2005 (EP) .................................... 05405480

(51) Int. Cl.
*G06F 11/00* (2006.01)
(52) U.S. Cl. ........................................................ 726/23
(58) Field of Classification Search .............. 726/22–25, 726/3, 11, 13; 709/224; 713/151–155, 168–170, 713/181
See application file for complete search history.

(56) References Cited

U.S. PATENT DOCUMENTS

| | | | | |
|---|---|---|---|---|
| 6,360,271 B1* | 3/2002 | Schuster et al. | ............... | 709/231 |
| 6,389,532 B1* | 5/2002 | Gupta et al. | .................. | 713/163 |
| 6,751,728 B1* | 6/2004 | Gunter et al. | ................ | 713/153 |
| 6,772,334 B1* | 8/2004 | Glawitsch | ....................... | 713/153 |
| 6,888,797 B1* | 5/2005 | Cao et al. | ....................... | 370/235 |
| 7,590,855 B2* | 9/2009 | Irwin | ............................ | 713/181 |
| 2002/0144156 A1* | 10/2002 | Copeland, III | ................ | 713/201 |
| 2004/0006693 A1* | 1/2004 | Vasnani et al. | ................ | 713/168 |
| 2004/0179517 A1* | 9/2004 | Yamamoto et al. | ........... | 370/356 |

OTHER PUBLICATIONS

Martin Krzywinski, Port Knocking, Linux Journal (Jun. 16, 2003), pp. 1-16.

* cited by examiner

*Primary Examiner* — Nirav B. Patel
(74) *Attorney, Agent, or Firm* — Ido Tuchman; William J. Stock (57) ABSTRACT

For port scanning an authentication bit sequence is created as an output of an authentication transformation, the authentication transformation having as input at least a given destination address and a given secret key. The authentication bit sequence is embedded in at least one authentication port scan event packet comprising the given destination address. At least one authentication port scan event packet is broadcast. Then, further port scan event packets are broadcast with given port identifiers and the given destination address. For port scanning detection, a received authentication bit sequence is derived from a least one authentication port scan event packet with identical source and destination addresses. Further port scan event packets are accepted with given port identifiers and the given destination address if authentication is given.

31 Claims, 5 Drawing Sheets

PORT SCANNING METHOD AND DEVICE, PORT SCANNING DETECTION METHOD AND DEVICE, PORT SCANNING SYSTEM, COMPUTER PROGRAM AND COMPUTER PROGRAM PRODUCT

CROSS-REFERENCE TO RELATED APPLICATIONS

This application claims priority under 35 U.S.C. §119 to European Patent Application No. 05405480.4 filed Aug. 17, 2005, the entire text of which is specifically incorporated by reference herein.

BACKGROUND OF THE INVENTION

The present invention relates to a port scanning method and a port scanning device. It further relates to a port scanning detection method and a port scanning detection device. It further relates to a port scanning system. It further relates to a computer program and to a computer program product.

Port scanners are widely used by network administrators but they are also maliciously used by hackers. A port scanner is designed to search a network host for open ports.

In the Internet protocol stack TCP/IP, hosts are identified by a unique IP address and services as well as applications running on a given host are referenced using two components, the IP address and a port number. Services and applications are processes running on a host. In the TCP and UDP protocol there are distinct and usable port numbers in the number range of 16 bit. Most services on the Internet use well-known port numbers (below 1024) which are assigned by the Internet Assigned Number Authority (IANA) while other processes can use ephemeral port numbers (between 1024 and 65535) for their communication.

Information gathered by a port scan has many legitimate uses, including the ability to verify the security status of a host in a network. Port scanning may, however, also be used for malicious intentions. Many exploits rely upon port scans to find open ports on which a potentially vulnerable process is listening and send large quantities of specific data in an attempt to trigger a condition known as a buffer overflow. Such behavior may compromise the security of hosts and a network as a whole, resulting in the loss or exposure of sensitive information and the ability to exploit a hosts processing power. An example for a known port scanner is "nmap".

Security assistants for networks or individual network devices include firewalls and access controls. In addition to that, intrusion detection systems are known, which monitor activity to identify malicious or suspicious events. An intrusion detection system acts as a sensor, like a smoke detector, that raises an alarm if specific suspicious patterns are observed. An intrusion detection system is designed for monitoring user, system, and networking activity, auditing system configurations for vulnerabilities and misconfigurations, recognizing known attack patterns in system and network activity, identifying abnormal activity through statistical analysis, managing audit trails and highlighting user violation of policies or normal activity, and installing and operating traps to record information about intruders. Known intrusion detection systems, also referred to as intrusion detection assistants, are designed to detect an attack by a series of TCP SYN packets sent to many different ports on a host in succession and in short time intervals, as would be the case for a port scan. Upon detection of such an attack, the intrusion system initiates some counteraction. These actions may comprise to increase the amount of data collected, to protect and act to reduce exposure, or also to notify a human being. Such intrusion detection assistants are disclosed in the article "Security In Networks", by Shari Lawrence Pfleeger, Charles Pfleeger on the Internet under http://www.informIT.com/articles/article.asp?p=31339&seqNum=5.

From U.S. Pat. No. 6,324,656 B1, a computer implemented method for rules driven multiphase network vulnerability assessment is known comprising pinging devices on a network to discover devices with connection to the network. Port scans are performed on a discovered device and banners are collected. Information from the collected banners is stored as entries in a first database. Analysis is performed on the entries by comparing the entries with a rule set to determine potential vulnerabilities.

From the article "Network Authentication Across Closed Ports", published in SYS Admin magazine 12 of 2003, the author being Krzywinsky, M., and also available under http://www.linuxjournal.com/article/6811, port knocking is disclosed. The article discloses that a firewall should provide protection against malfeasant actions while allowing trusted users to connect. It is not always possible to filter out malicious traffic because filtering on the basis of IP addresses and ports does not distinguish connecting users. An attacker may send traffic from trusted IP addresses. However, open ports remain a potential vulnerability: they allow connections to processes on a host and therefore may turn into open doors for attacks. Port knocking is a method in which trusted users manipulate firewall rules by transmitting information across closed ports. In this respect, users make connection attempts to sequences of closed ports. The failed connections are logged by the service-side packet filtering firewall and detected by a daemon that monitors the firewall log file. When a properly formatted knock sequence, playing the role of the secret used in the authentication, is received, firewall rules are manipulated based on the information content of the sequence. In commonly deployed firewalls, filtering is done either by the IP address of the connecting host or by the port to which the host is connecting. Firewalls examine and interact with packets before any user authentication takes place. Therefore, they do not discriminate amongst users attempting to open a connection. It is expected that once the firewall has approved the packet and allowed it to enter the network, downstream applications will handle user authentication. Port knocking provides an authentication system that works across closed ports, eliminating the risks associated with publicly open ports. During the port knocking procedure, a commonly agreed upon port sequence is addressed which acts as a header of the port knocking. After that, a connection is made to further ports, from which sequence the receiving host may derive the actually intended port to be opened. The host may then open the respective port which is then available for communication. To minimize a risk of a functional sequence being constructed by an intercepting party, it is known from the above-mentioned article to encrypt information content containing the remote IP of the sequence. For this, one-time passwords or one-time pads are used for encryption. It is further known to encrypt the remote IP, the ports, the time and checksum.

It is a challenge to provide a port scanning method and a respective port scanning device, which are versatile and at the same time are efficient. It is a further challenge to provide a port scanning detection method and device, which are versatile and at the same time are efficient. It is a further challenge to provide a port scanning system, which is versatile and at the same time is efficient.

BRIEF SUMMARY OF THE INVENTION

According to a first aspect of the invention, a port scanning method is provided, comprising creating an authentication bit sequence as an output of an authentication transformation. The authentication transformation has as input at least a given destination address and a given secret key. It further comprises embedding the authentication bit sequence in at least one authentication port scanning event packet comprising the given destination address. It further comprises broadcasting the at least one authentication port scan event packet, which may by way of example but nonetheless limited to this, be a TCP SYN packet or a UDP packet of zero bit length, broadcasting further port scan event packets with given port identifiers and a given destination address. This enables a secure authentication, characterizing a benign port scan and then an efficient creation and a broadcast of the further port scan event packets for receiving further information about given ports represented by the port identifiers. By creating the authentication bit sequence dependent on the given destination address, a versatile implementation is enabled, as a respective port scanning detection may then be conducted also on network devices apart from the one with the given destination address, such as a router.

According to one embodiment of the first aspect of the invention, the authentication transformation has as further input at least part of at least one of the authentication port scan event packets other than the given destination address. This enables to further increase the reliability of the authentication and its robustness against malicious manipulation.

In this respect, it is advantageous if that further input is a source address. This enhances the robustness against malicious manipulation of the source address of the authentication bit sequence by intercepting the authentication bit sequence and succeeding with such a malicious manipulation.

In this respect, it is further advantageous if that further input comprises a nonce derived from a current time. A nonce is an arbitrary number that is generated for security purposes and is only used once. Preferably, but nonetheless limited to this, the nonce is created based on a current time, preferably, but nonetheless limited to, using the network time protocol (NTP). This significantly reduces the risk of replay attacks.

In this respect, it is further advantageous if the further input comprises a time stamp. Also, this significantly reduces the risk of the replay attack.

In this aspect, it is further advantageous if the further input comprises a key number identifying the given secret key. In this way, a variety of keys may be used.

In a further embodiment of the first aspect of the invention, the method comprises adding error correction bits to the authentication bit sequence dependent on a given error code transformation having as input the authentication bit sequence. In this way, the effect of lost packets during a broadcasting may be significantly reduced.

In this context, it is particularly advantageous if this error code transformation is a Reed-Solomon-Code transformation. The Reed-Solomon-Code transformation is particularly efficient for this purpose.

In a further embodiment of the first aspect, the method comprises broadcasting the at least one authentication port scan event packet and/or the further port scan event packets with an inter-packet time duration, being characteristic for the time between two consecutive broadcasts of consecutive port scan event packets, the inter-packet time duration being greater than a given minimum inter-packet time duration. This enables that conducting the port scanning method is not interpreted as a denial of service attack. In this context, it is advantageous if the minimum inter-packet time duration is chosen in order to not exceed a CPU load of the destination by around 10% of the maximum CPU load by processing the port scan event packets in the destination.

In this context, it is also advantageous if the minimum inter-packet time duration is chosen not to exceed around the order of 1 second, preferably, but nonetheless limited to around 1 to 5 seconds.

In a further embodiment of the first aspect of the invention, the method comprises embedding the authentication bit sequence in a destination port field and/or in a source port field and/or in an IP-option field of the authentication port scan event packet. This enables a more efficient broadcast of the information and may increase the information transfer rate. This may also be used to increase the security of the authentication.

In a further embodiment of the first aspect of the invention, the method comprises the authentication port scan event packet being a TCP SYN-packet. This enables a simpler identification of the respective packet as the authentication port scan event packet.

In a further embodiment of the first aspect of the invention, the authentication port scan event packet is a UDP-zero-bit-packet. This enables a simpler identification of the respective packet as the authentication port scan event packet.

In a further embodiment of the first aspect of the invention, the method comprises creating a first authentication bit sequence using a given symmetric secret key, embedding the first authentication bit sequence in at least one authentication port scan event packet comprising the given destination address, broadcasting the at least one authentication port scan event packet, creating a second authentication bit sequence using a given asymmetric public secret key, embedding the second authentication bit sequence in at least another authentication port scan event packet comprising the given destination address, broadcasting the at least another authentication port scan event packet and broadcasting further port scan event packets with given port identifiers and the given destination address. This further increases security by the two-step approach, but still limits the high calculation expenses caused by public/private key operations. Therefore, more CPU effort for verification and cracking the authentication by a malicious third party would be the result.

According to a second aspect, a device for implementing the method for port scanning according to the first aspect of the invention is provided. The device for implementing the method for port scanning corresponds to the method for port scanning and its advantageous and preferred embodiments and also, respectively, to the respective advantages.

According to a third aspect of the invention, a port scanning detection method is provided, comprising deriving a received authentication bit sequence from at least one authentication port scan event packet with identical source addresses. It further comprises determining dependent on the received authentication bit sequence and a destination address being comprised in the at least one authentication port scan event packet and a secret key whether an authentication is given. It further comprises accepting further port scan event packets with given port identifiers and the given destination address if the authentication is given and denying further port scan event packets with given port identifiers and a given destination address or initiating an alarm action if the authentication is not given.

The given destination address of the further port scan event packet is equal to the one of the authentication port scan event packets. The given port identifiers of the further port scan event packets are just given by the further port scan event packets but may vary among the different further port scan event packets. This enables a secure authentication, characterizing a benign port scan, and then an efficient processing of the further port scan event packets which allows the detection of potential vulnerabilities. With the authentication bit sequence being dependent on the given destination address, a more versatile implementation is enabled, as the port scanning detection may be conducted also on network devices apart from the one with the given destination address, such as a router. This aspect also enables more efficiently the application of encryption/decryption methods or also of hash functions and the like.

According to an embodiment of the third aspect of the invention, the method comprises creating a reference authentication bit sequence as an output of an authentication transformation, the authentication transformation having as input at least a given destination address and the secret key. It further comprises determining dependent on the received authentication bit sequence and the reference authentication bit sequence whether the authentication is given. This enables a more efficient determination whether the authentication is given.

In a further embodiment of the third aspect of the invention, the method comprises determining whether the authentication is given further dependent on a further input being at least part of at least one of the authentication port scan event packets other than the given destination address. In this context, it is advantageous if the further input is a source address and/or a nonce derived from a current time and/or a time stamp or a key number identifying the secret key.

In a further embodiment of the third aspect of the invention, the method comprises adding error correction bits to the authentication bit sequence dependent on a given error code transformation having as input the authentication bit sequence. In this context, it is advantageous if the error code transformation is a Reed-Solomon-Code transformation.

According to a further embodiment of the third aspect of the invention, the method comprises denying the authentication or initiating an alarm action if at least one authentication port scan event and/or the further port scan event packets are received with an inter-packet time duration being characteristic for the time being two consecutive broadcasts of consecutive port scan event packets, the inter-packet time duration being smaller or equal to a given minimum inter-packet time duration. In this context, it is preferred if the minimum inter-packet time duration is chosen in order not to exceed the CPU load of the destination by 10% of the maximum CPU load resulting in processing the port scan event packets. In this context, it is also advantageous if the minimum inter-packet time duration is chosen not to exceed around the order of one second.

According to a further embodiment of the third aspect of the invention, the method comprises extracting the authentication bit sequence from a source port field and/or an IP-options field of the authentication port scan event packet.

According to a further embodiment of the third aspect of the invention, the authentication port scan event packet is a TCP SYN-packet and/or a UDP-zero-bit-packet.

In a further embodiment of the third aspect of the invention, the method comprises deriving a first received authentication bit sequence from at least one authentication port scan event packet with identical source addresses, determining dependent on the first received authentication bit sequence and a destination address being comprised in the at least one authentication port scan event packet and a given symmetric key whether a first authentication is given. The method further comprises then deriving a second received authentication bit sequence from the at least one authentication port scan event packet with identical source addresses and determining dependent on the second received authentication bit sequence and a destination address being comprised in the at least another one authentication port scan event packet and a given asymmetric private secret key whether a second authentication is given. It then further comprises accepting further port scan event packets with given port identifiers and a given destination address if the first and second authentication are given and otherwise denying further port scan event packets with given port identifiers and the given destination address or initiating an alarm action. This third aspect and its preferred embodiments corresponds to the first aspect and, therefore, also the respective advantages correspond.

According to a fourth aspect of the invention, a device for implementing the method for port scanning detection is provided. The device and its preferred embodiments corresponds to the third aspect of the invention and also to its advantages.

According to a fifth aspect of the invention a system for port scanning is provided which comprises the devices according to the second and fourth aspect of the invention. The preferred embodiments and the advantages correspond respectively.

According to a sixth aspect of the invention a computer program product is provided comprising a computer readable medium embodying program instructions executable by a computer to create an authentication bit sequence as an output of an authentication transformation, the authentication transformation having as input at least a given destination address and a given secret key, to embed the authentication bit sequence in at least one authentication port scan event packet comprising the given destination address, to broadcast the at least one authentication port scan event packet and to broadcast further port scan event packets with given port identifiers and the given destination address. The sixth aspect and its preferred embodiments corresponds to the first aspect of the invention and also to its advantages.

According to a seventh aspect of the invention a computer program comprising program instructions adapted to perform all the steps of one of the first aspect or the third aspect when it is run on a computer. The seventh aspect and its preferred embodiments corresponds to the first aspect of the invention and also to its advantages or respectively to the third aspect of the invention and also to its advantages.

According to an eighth aspect of the invention a computer program product is provided comprising a computer readable medium embodying program instructions executable by a computer to derive a received authentication bit sequence from at least one authentication port scan event packet with identical source addresses, to determine dependent on the received authentication bit sequence and a destination address being comprised in the at least one authentication port scan event packet and a secret key whether an authentication is given, to accept further port scan event packets with given port identifiers and the given destination address, if the authentication is given, to deny further port scan event packets with given port identifiers and the given destination address or initiating an alarm action, if the authentication is not given. The eighth aspect and its preferred embodiments corresponds to the third aspect of the invention and also to its advantages.

DETAILED DESCRIPTION OF THE INVENTION

In the following, a description will be provided of the present invention through an embodiment of the present invention. However, the following embodiments do not restrict the invention in the scope of the invention and all combinations of features explained in the embodiment are not always essential to means of the invention for solving the problems.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 1:
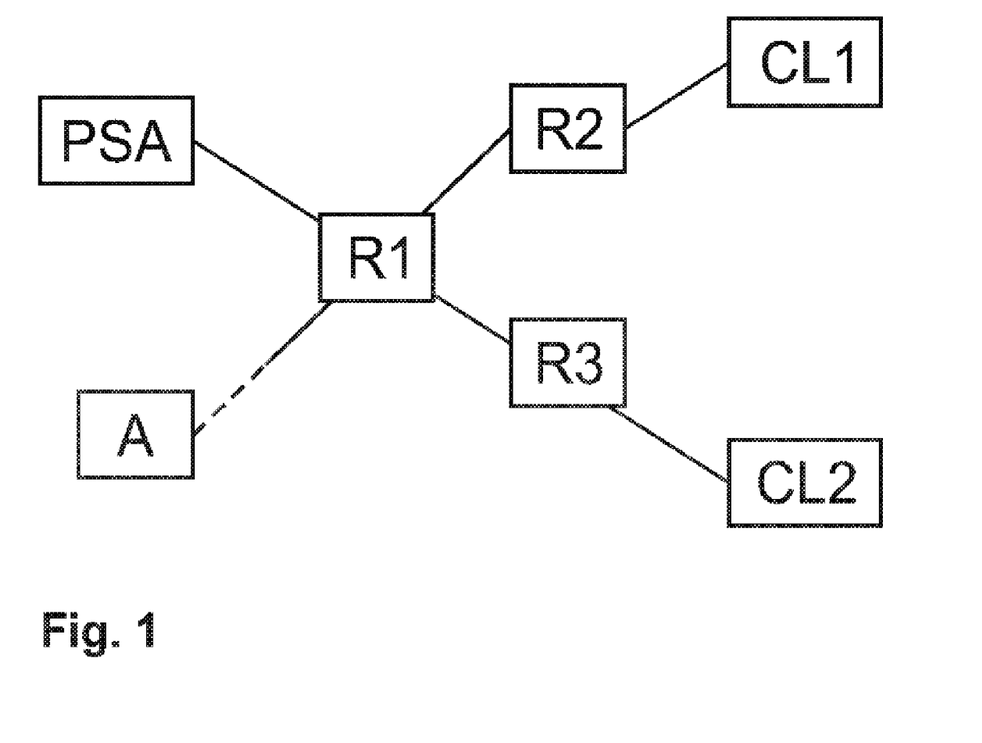
FIG. 1 shows an exemplary network contemplated by the present invention comprising various network devices and an attacker.

FIG. 1 is a block diagram of one embodiment of a network comprising various network devices, the network devices being hosts, clients, routers or other network devices. In particular, it comprises a port scan authority PSA and first to third routers R1, R2, R3 and first and second clients CL1, CL2. In addition to that, an attacker A is shown. The different devices being part of the network are able to establish connections to other devices of the network. The port scan authority is designed to run a program for port scanning, in particular a computer program. For this purpose, the port scanning authority may be embodied by a host but is not limited to that. For example, the program may also be run on different hosts and be, respectively, split up. For port scanning detection, one of or more of the routers R1 to R3 or also one or more of the clients CL1, CL2 may be designed for storing and/or running a respective program, in particular a computer program. In one exemplary embodiment, the program for port scanning detection is run and possibly stored in the first router R1. Alternatively or in addition to that, the port scanning detection program may be stored and/or run on the first client. It becomes clear that the execution also of the port scanning detection program may be distributed over various network devices.

In the following, the program for port scanning is described in further detail with the aid of FIG. 2 and the program for the corresponding port scanning detection is described in further detail with the aid of the FIGS. 3 and 4.

Figure 2:
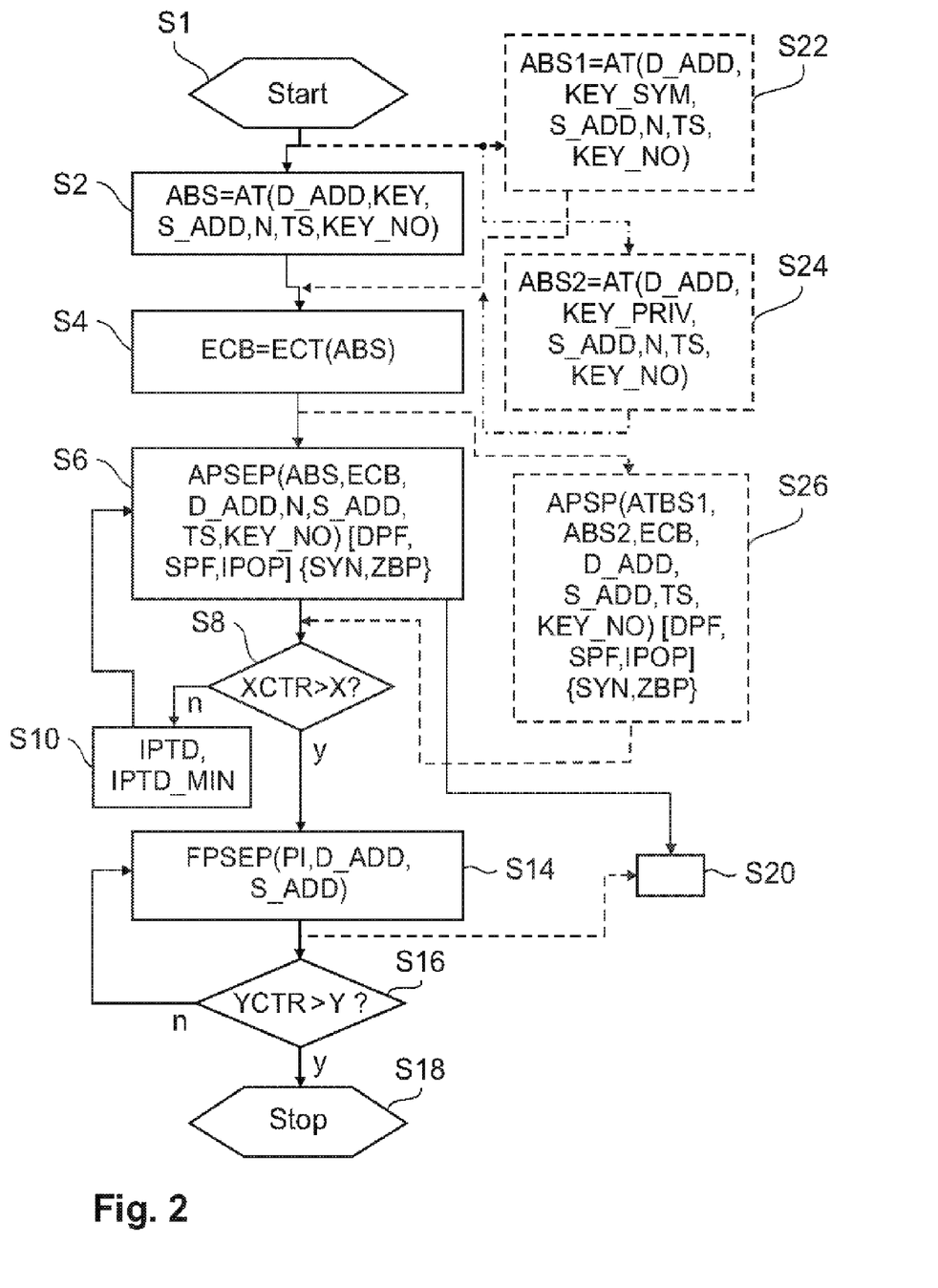
FIG. 2 shows an exemplary flow chart of a program for port scanning contemplated by the present invention.

The program for port scanning is started in a step S1 (FIG. 2). The start may occur any time, whenever a port scan is intended to be run. In the step S1, variables may be initialized.

In a step S2, an authentication bit sequence ABS is created by making an authentication transformation. The authentication transformation AT has as inputs a given destination address D_ADD, representing the network device to be scanned and a given secret key KEY. It may have as additional inputs a source address S_ADD, representing the network device on which the port scan program is run or one of the devices on which the port scan program is run, and/or a nonce N, and/or a time stamp TS, and/or a key number KEY_NO. It may also comprise further inputs, for example further parts of at least one authentication port scan event packet APSEP. The authentication port scan event packet APSEP is preferably an Internet protocol datagram packet comprising the well-known fields being fixed by the Internet protocol. They comprise the Internet packet header which comprises a destination address field, a source address field, a destination port field DPF, a source port field SPF, an IP-options field IPOP amongst others such as a flag field, a type of service field, a protocol field indicating the kind of transport the packets are being carried, such as TCP or UDP.

The authentication transformation AT is a cryptographic transformation. It may be, for example, a hash function or the like or may be an encryption/decryption. The key KEY may be a given symmetric key KEY_SYM upon which the parties which intend to cooperate have agreed upon or it may be also a given asymmetric private secret key KEY_PRIV with an associated public key KEY_PUB which was made publicly available to the parties the cooperation is intended to be done with. In this way, the authentication transformation AT may for example be apart from, for example a hash function, an encryption transformation using either symmetric encryption or public/private key encryption. The key KEY preferably has a bit length of around the bit length of the authentication bit sequence ABS and may be chosen to have a bit length of 128 bit or 256 bit, for example. In this respect, the authentication bit sequence ABS should be chosen appropriately, preferably also in the range from 128 to 256 bits and not larger than the sum of the sizes of the AT arguments. The nonce N is an arbitrary number that is generated from a current time value. The time resolution of the nonce N should be at least in the range of the time at maximum needed for broadcasting, receiving, and processing the respective authentication bit sequences ABS over the network and may, for example, be in the range of minutes. A time synchronization within the network may be achieved using the network time protocol (NTP) but also taking into consideration that a relatively coarse time correlation, for example in the order of an hour or a day, would be sufficient. The nonce ensures that the authentication bit sequence ABS may be used just once. The time stamp may also represent the current time. The key number KEY_NO may represent the selected key if, for example, more than one key is present.

In a step S4, which may, however, also be omitted, error correction bits ECB are created by a given error code transformation ECT having as input the authentication bit sequence ABS. Such error code transformations ECT are well-known and may be incorporated e.g. as a simple checksum or more preferred as a Reed-Solomon-Code, which is a coding scheme which works by first constructing a polynomial from the authentication bit sequence ABS and then transforming it into an over-sampled plot of the polynomial as output.

In a step S6, the authentication port scan event packet APSEP is created and then broadcasted over the network. The authentication port scan event packet APSEP is imposed with the given destination address D_ADD and/or part of or the full authentication bit sequence ABS and/or the error correction bits ECB and/or the source address S_ADD and/or the time stamp TS and/or the key number KEY_NO depending on which of these have been used in the step S2 or whether step S4 has been conducted. The authentication port scan event packet APSEP may also be imposed with the nonce N.

Preferably, the authentication port scan event packet APSEP is a TCP SYN packet or UDP zero-bit-packet ZBP. It may, however, also be some other kind of packet. The authentication bit sequence ABS or the part of it and/or the error correction bits ECB and/or the time stamp TS and/or the key number KEY_NO may be stored in one of or a combination of the destination port field DPF, the source port field SPF, the IP-options field IP_OP or another for storing information available field of the authentication port scan event packet APSEP. By using various such fields, the amount of information being able to be transferred by one single authentication port scan event packet APSEP for the authentication purposes may be significantly increased. In one example, 16 bits of the authentication bit sequence ABS may be imposed to each one of the authentication port scan event packets APSEP. In the case of the bit length of the authentication bit sequence ABS being 256 bits, an overall of 16 or more authentication port scan event packets APSEP may then be necessary to broadcast the whole authentication bit sequence ABS. A threshold X is then chosen in order to ensure that the whole authentication bit sequence ABS and the other related information, such as the error correction bits ECB or the time stamp TS or the key number KEY_NO may be transmitted.

After creating the authentication port scan event packet APSEP, it is then broadcast over the network.

In a step S8, it is checked whether a first counter XCTR exceeds the first threshold X which is chosen as described above in order to ensure the broadcast of the information intended to be broadcasted. The first counter XCTR is increased every time step S6 is run and is reset, when step S14 is run. If the condition of step S8 is not fulfilled, then execution is continued in a step S10 where further execution is paused for ensuring an inter-packet time duration IPTD not being less than a given minimum inter-packet time duration IPTD_MIN, which is chosen in order to keep a CPU load of the destination device below a given threshold, for example 10% of its maximum CPU load and/or in order to ensure that the receiving network device does not misinterpret the broadcast of the authentication port scan event packets APSET as denial of service attack. Therefore, the given minimum inter-packet time duration IPTD_MIN may be given in the order around one second, preferably around 1 to 5 seconds. After executing step S10, execution is continued again in step S6.

If the condition of step S8 is, fulfilled, then further port scan event packets FPSEP are created in step S14 being allocated with given port identifiers representing the ports being intended to be scanned and the given destination address D_ADD for which the authentication has been conducted and the source address S_ADD of the device where this program is run. In a step S16, it is checked whether a second counter YCTR exceeds a second threshold Y which represents the amount of ports intended to be scanned. The second counter Y is increased every time step S14 is run. With each run of the step S14, the port identifier PI may be allocated with a different value. Preferably, a step corresponding to step S10 may be inserted after step S16 and before step S14.

If the condition of step S16 is fulfilled, then execution is stopped in a step S18. Parallel to the aforementioned steps, a step S20 is conducted in which it is listened for replies from the scanned network device and then appropriate evaluation of the replies representing, for example, the status of the scanned ports is stored and/or further evaluated. S20 may hence be conducted after step S6 and/or after step S14. This may be done for assessing vulnerability questions or other questions. The program according to FIG. 2 may be incorporated in a network administrator tool to get information about the network which is administrated.

Alternative to this, a so-called two-step approach may also be taken where in a first stage step S2 is replaced by a step S22 and step S6 is replaced by a step S26 and the respective steps are then run until the condition of step S8 is fulfilled. Then, step S2 is replaced by step S24 and then again the steps S24, S4, S6, S8, and S10 are run until the condition of step S8 is fulfilled. The step S22 comprises that a symmetric key KEY_SYM is used. Then in a step S24, a private key KEY_PRIV for asymmetric encryption is used. In step S26 then, the respective first or respective second authentication bit sequence ABS1, ABS2 are then consecutively broadcasted.

Figure 3:
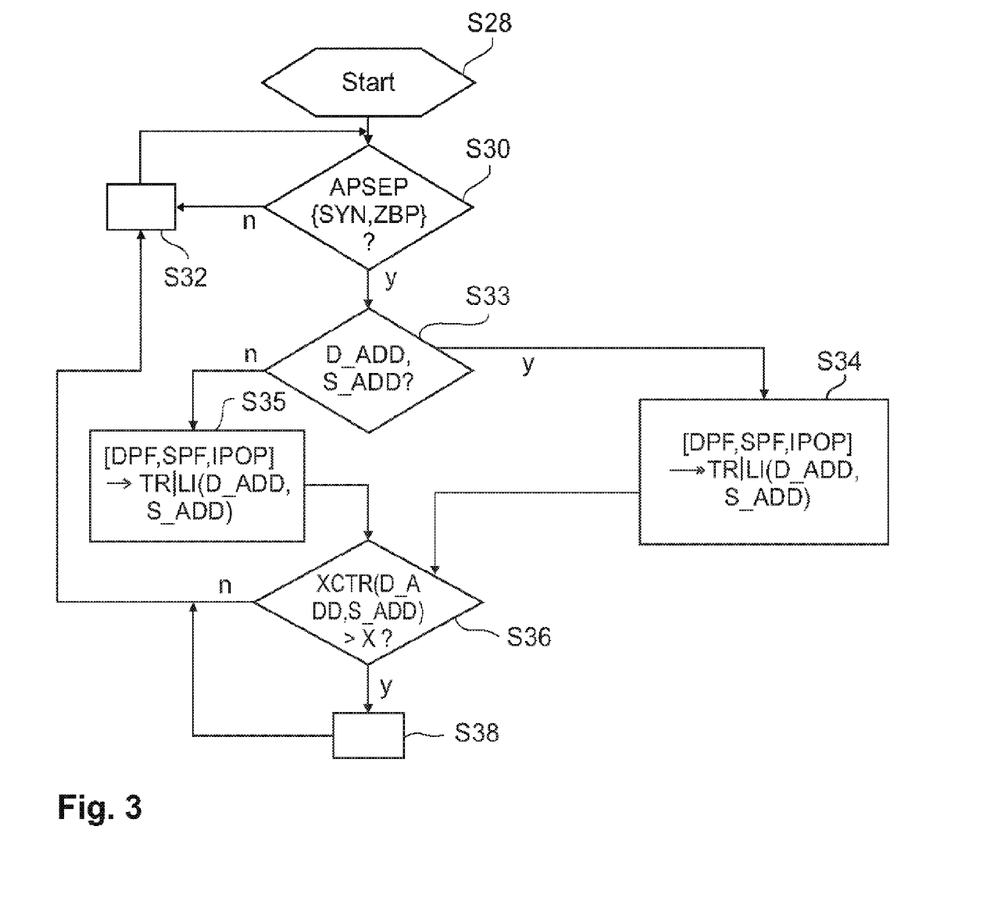
FIG. 3 shows an exemplary first flow chart of a program for port scanning detection contemplated by the present invention.

In FIG. 3, a flow chart representing a first part of a port scanning detection program is represented. The port scanning detection program is started in a step S28, in which variables may be initialized.

In a step S30, it is evaluated whether an authentication port scan event packet APSEP has arrived. A packet arriving may be detected as an authentication port scan event packet APSEP by its particular form of packet such as, for example, the TCP SYN packet SYN or the UDP zero-bit-packet ZPB. If the condition of step S30 is not fulfilled, then execution is continued in a step S32, where the program preferably pauses for a given time until the next packet arrives, which may be very short. After step S32, execution is continued in step S30.

In a step S33, which is conducted if the condition of step S30 is fulfilled, the given destination address D_ADD and the source address S_ADD are extracted from the respectively received authentication port scan event packet APSEP and it is checked whether other corresponding authentication port scan event packets APSEP have been received with identical destination and source addresses D_ADD, S_ADD. If this is the case, the respective information extracted from the respective fields of the authentication port scan event packet APSEP is stored in a respective corresponding position of a tree TR or a table TAB for further later processing in a step S34. These fields may, depending on which fields one has agreed on, contain the transmitted authentication bit sequence ABS and related information, which are stored in portions of the destination port field DPF and/or the source port field SPF and/or the IP-option field IPOP or other appropriate fields. Execution is then continued in step S36. Otherwise in a step S35, a new entry in the tree TR or the table TAB corresponding to the destination address and the source address D_ADD, S_ADD is made and the respective information is extracted from the respective fields of the authentication port scan event packet APSEP and stored also. In this case, execution is continued also in step S36.

In step S36, it is checked whether the first counter XCTR exceeds the first threshold X. The first counter is related to the respective pair of destination address and source address D_ADD, S_ADD and may be initialized again after a given time duration. The first threshold X may also be greater than the amount of authentication port scan event packets APSEP necessary for transmitting the relevant information, such as the authentication bit sequence ABS, in order to enable to take into consideration that even though the authentication port scan event packet APSEP may be sent in a given timely order before also further port scan event packets FPSEP were sent, their arrival may be in another order. If the condition of step S36 is not fulfilled, then execution is continued in step S32. Otherwise, execution is continued in step S38, which triggers the start of the program further described by aid of FIG. 4.

In a step S40, the program is started and possibly variables are initialized. In a step S42, a received authentication bit sequence ABSREC is derived from the respective information which has been extracted from respective fields of the authentication port scan even packet APSEP or the authentication port scan event packets APSEP and stored in the tree or in the table described above with identical pairs of source and destination addresses S_ADD, D_ADD. In addition to that, also other information is extracted from the respective information in the tree, such as the time stamp TS and the respective key number KEY_NO and/or the error correction bits ECB. The way this information is concatenated, in particular the authentication bit sequence ABS, may be on the first run of step S42 be determined by the order in which the respective information from the authentication port scan event packets APSEP are stored in the tree or the respective table. It may, however, be also in another order.

In a step S44, a reference authentication bit sequence ABSREF is created as an output of an authentication transformation. This authentication transformation AT is the same as the one of step S2 or may be the inverse one. The input of the authentication transformation AT comprises at least the given destination address D_ADD and the secret key KEY, which may be dependent on the authentication transformation AT a respective symmetric key KEY_SYM or a public key KEY_PUB. The input preferably further comprises at least part of the information extracted earlier from at least one of the respective authentication port scan event packets APSEP other than the destination address D_ADD and in this way may comprise, for example, the source address S_ADD, the time stamp TS or a key number or others. In addition to that, it may comprise the nonce N which is created by the program in step S44 or was created when receiving the respective authentication port scan event packet APSEP. The received authentication bit sequence may be created by any respective authentication transformation AT also including hash functions or others.

In a step S46, it is checked whether the received authentication bit sequence ABSREC is equal to the reference authentication bit sequence ABSREF. If this is the case, then in step S52 the authentication is assumed to be given with the consequence that preferably for a given time duration which may be, for example, in the range of certain minutes or certain hours or up to less than a day or other, further reception of further port scan event packets FPSEP from the same source address is allowed and does not trigger an alarm action A_A. If the condition of step S46 is not fulfilled, then in a step S48 it is checked whether all or a given amount of reordering possibilities of the received authentication port scan event packets APSEP relevant for step S42 have been already made. If this is not the case, then a further reordering is triggered and execution is continued again in step S42. In this way, the possible different way of ordering of the received authentication port scan event packets APSEP compared to the order of broadcasting the authentication port scan event packets APSEP is taken into consideration.

If the condition of step S48 is not fulfilled, then in step S50 an error code transformation corresponding to the one of step S4 may be applied using the error correction bits ECB in order to compensate and reconstruct possible lost parts of the bit sequences or packets. After step S50 execution is continued again in step S42, if still an error code transformation that not has yet been conducted is possible. If, however, the condition of step S50 is not fulfilled, then it is assumed that the broadcast of or at least the reception of the authentication port scan event packets APSEP is not authorized and may be part of a malicious attack. In this way, in step S63 some alarm action A_A may be taken which may comprise either denying further access to given ports or further documentation or also alerting a human being or other alarm actions. After that, execution is stopped in a step S62 and the information for the given source and destination address pair stored in the tree or table can be removed. In parallel, expired entries in the tree or the table are removed periodically in time intervals not smaller than X*IPTD_MIN in step S64. Testing for reordering in step S48 might be done only partially or completely omitted. The same applies for step S50.

Figure 4:
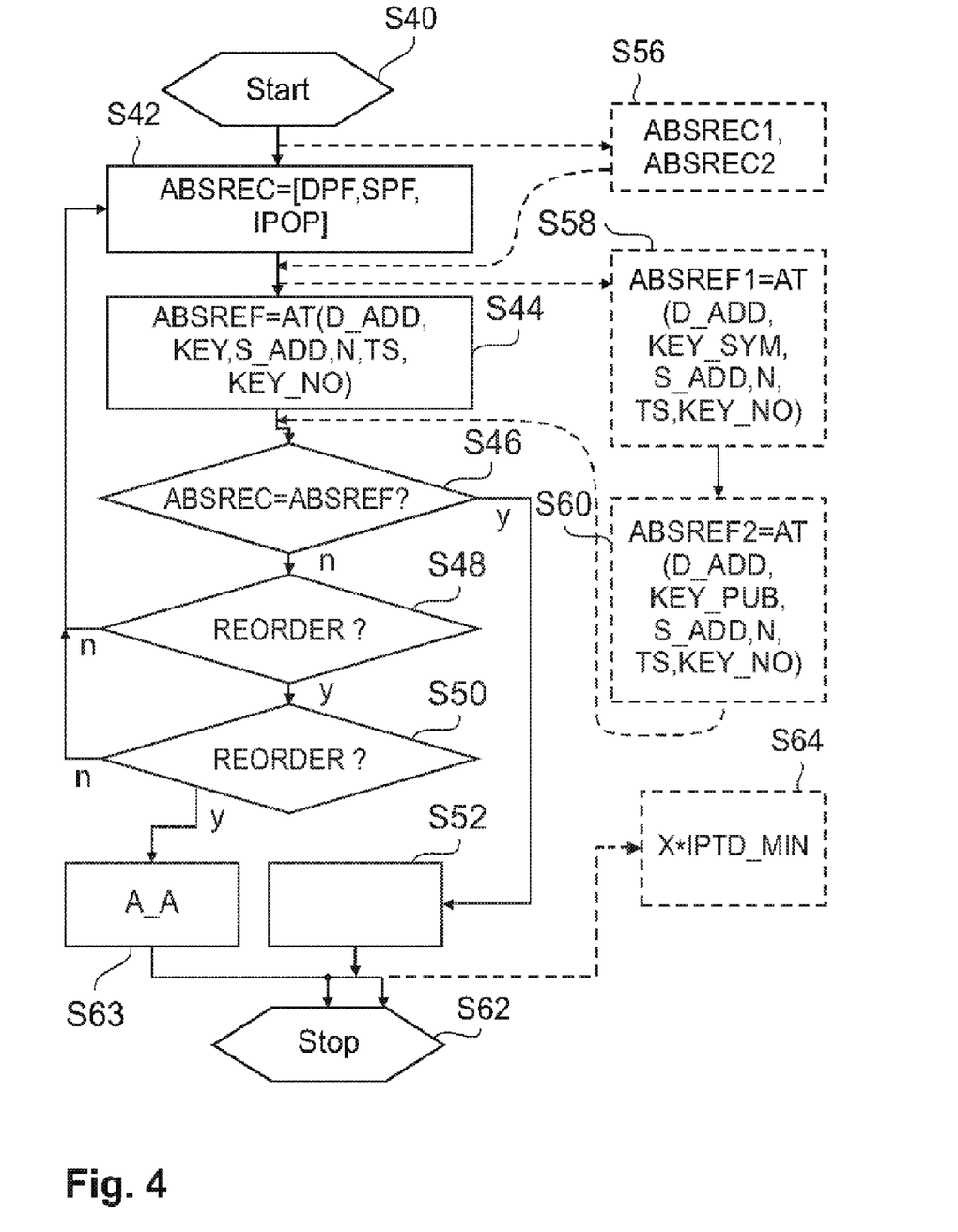
FIG. 4 shows an exemplary second flow chart of a program for port scanning detection contemplated by the present invention.

If the two-step approach according to the program according to FIG. 2 is taken, then also a respective two-step approach is taken by the program of FIG. 4 leading to the replacement of step S42 with a respective step S56 which only differs from that in one occasion the first received authentication bit sequence ABSREC1 derived and then the second received authentication bit sequence ABSREC2 is derived accordingly as in step S42. In addition to that, respectively, for creating a first reference authentication bit sequence ABSREF1 and a second reference authentication bit sequence ABSREF2, respective steps S58 and S60 are provided replacing step S44 for different runs of the step sequence of the program. In step S58 the secret key KEY is the symmetric secret key KEY_SYM. In step S60 the secret key KEY is the public secret key KEY_PUB. Especially when applying the private key/public key encryption, also the second received authentication bit sequence ABSREC2 may be decoded using the public key KEY_PUB and the then resulting decoded information such as the destination address and/or the source address and/or the time stamp and/or the key number or the like may be compared with the ones directly derived from the respective authentication port scan event packets in order to check whether an authentication is given. In the two step approach the condition of step S46 is only fulfilled if both received authentication bit sequences have been validly authenticated.

Figure 5:
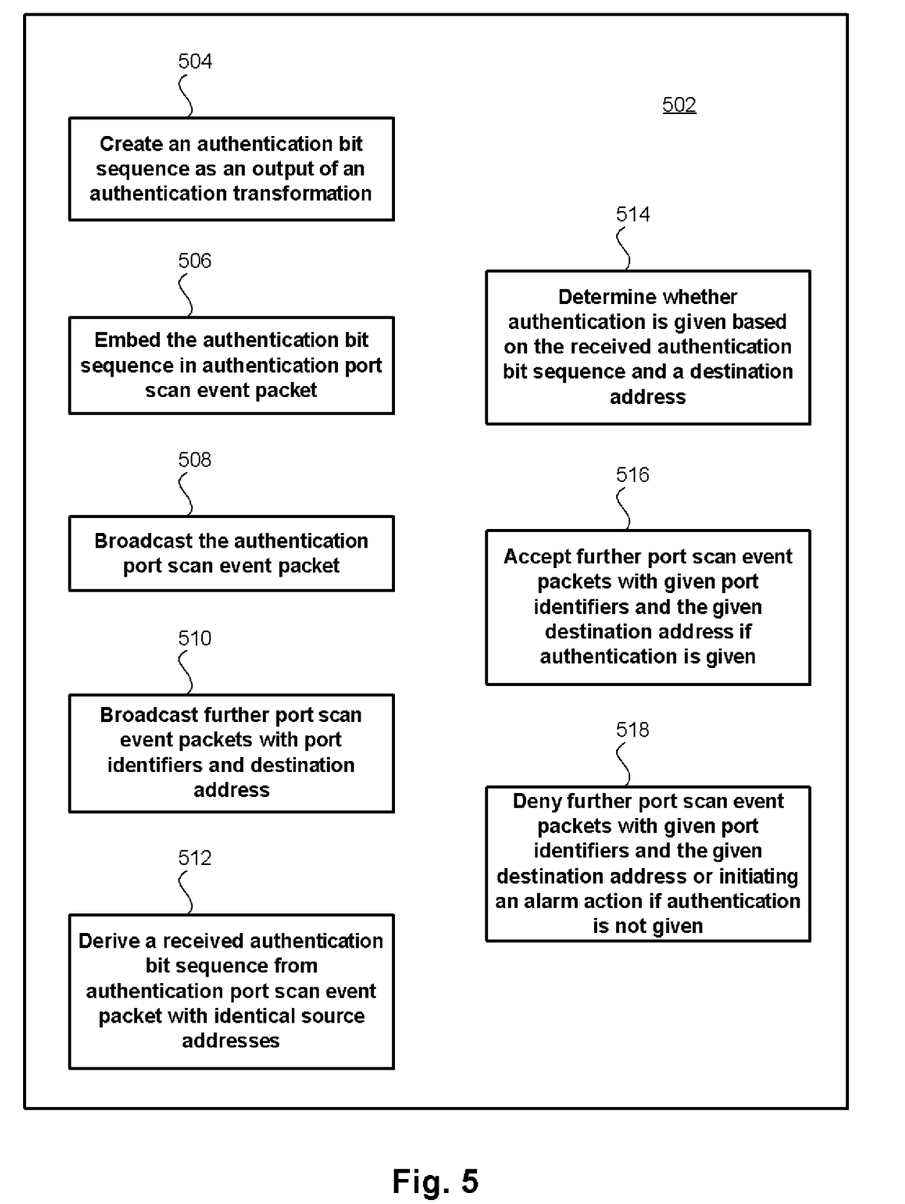
FIG. 5 shows an exemplary device contemplated by the present invention.

Turning now to FIG. 5, an exemplary port scanning device 502 is shown. It is contemplated that the port scanning device 502 may alternatively be embodied as a method of operation or computer readable program codes coupled to the tangible media forming a computer program product.

The port scanning device 502 includes a create module 504 configured to create an authentication bit sequence as an output of an authentication transformation. The authentication transformation has as input at least a given destination address and a given secret key.

An embedding module 506 is configured to embed the authentication bit sequence in at least one authentication port scan event packet comprising the given destination address.

A first broadcast module 508 is configured to broadcast the at least one authentication port scan event packet. A second broadcast module 510 is configured to broadcast further port scan event packets with given port identifiers and the given destination address.

A deriving module 512 is configured to derive a received authentication bit sequence from at least one authentication port scan event packet with identical source addresses.

A determining module 514 is configured to determine whether authentication is given based on the received authentication bit sequence and a destination address being comprised in the at least one authentication port scan event packet and a secret key.

An accepting module 516 is configured to accept further port scan event packets with given port identifiers and the given destination address if the authentication is given.

A denying module 518 is configured to deny further port scan event packets with given port identifiers and the given destination address or initiating an alarm action if the authentication is not given.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A port scanning method comprising:
   creating an authentication bit sequence as an output of an authentication transformation, the authentication transformation having as input at least a given destination address and a given secret key;
   adding error correction bits to the authentication bit sequence dependent on a given error code transformation comprising a Reed-Solomon-Code transformation and having as input the authentication bit sequence;
   embedding the authentication bit sequence in at least one authentication port scan event packet comprising the given destination address, the authentication port scan event packet being a TCP SYN-packet;
   embedding the authentication bit sequence in a destination port field and/or in a source port field and/or in an IP-options field of the authentication port scan event packet;
   broadcasting the at least one authentication port scan event packet;
   broadcasting further port scan event packets with given port identifiers and the given destination address;
   broadcasting the at least one authentication port scan event packet and/or the further port scan event packets with an inter-packet time duration, being characteristic for the time between two consecutive broadcasts of consecutive port scan event packets and being greater than a given minimum inter-packet time duration chosen in order to not exceed a CPU load of the destination by substantially 10% of the maximum CPU load, when processing the port scan event packets;
   deriving a received authentication bit sequence from at least one received authentication port scan event packet with identical source addresses, the at least one received authentication port scan event packet comprising a received destination address, the received authentication port scan event packet being a TCP SYN-packet;
   extracting the received authentication bit sequence from a destination port field and/or a source port field and/or an IP-options field of the received authentication port scan event packet;
   adding error correction bits to the received authentication bit sequence dependent on a given error code transformation including a Reed-Solomon-Code transformation and having as input the received authentication bit sequence;
   creating a reference authentication bit sequence as an output of an authentication transformation having as input at least the given received destination address and the secret key;
   determining dependent on the received authentication bit sequence, the received destination address and the reference authentication bit sequence whether an authentication is given, wherein determining whether the authentication is given is further dependent on a further input including at least part of at least one of the received authentication port scan event packets other than the given received destination address, a source address, a nonce derived from a current time, a time stamp, and a key number identifying the secret key;

accepting further received port scan event packets with given port identifiers and the given received destination address, if the authentication is given;

denying further received port scan event packets with given port identifiers and the given received destination address or initiating an alarm action, if the authentication is not given; and denying the authentication, if the at least one received authentication port scan event packet and/or the further received port scan event packets are received with an inter-packet time duration, being characteristic for the time between two consecutive broadcasts of consecutive received port scan event packets and being smaller than or equal to a given minimum inter-packet time duration chosen not to exceed a CPU load of the destination by approximately 10% of the maximum CPU load, when processing the received port scan event packets;

wherein the authentication transformation used to create the authentication bit sequence has as further input at least part of at least one of the authentication port scan event packets other than the destination address input to the authentication transformation used to create the authentication bit sequence, a source address, a nonce derived from a current time, a time stamp, and a key number identifying the given secret key.

2. A port scanning method comprising:

creating an authentication bit sequence as an output of an authentication transformation, the authentication transformation having as input at least a given destination address and a given secret key;

embedding the authentication bit sequence in at least one authentication port scan event packet comprising the given destination address;

broadcasting the at least one authentication port scan event packet;

broadcasting further port scan event packets with given port identifiers and the given destination address;

broadcasting the at least one authentication port scan event packet and/or the further port scan event packets with an inter-packet time duration, being characteristic for the time between two consecutive broadcasts of consecutive port scan event packets, the inter-packet time duration being greater than a given minimum inter-packet time duration; and wherein the minimum inter-packet time duration being chosen in order to not exceed a CPU load of the destination by substantially 10% of the maximum CPU load, when processing the port scan event packets.

3. The method according to claim 2, wherein the authentication transformation having as further input at least part of at least one of the authentication port scan event packets other than the given destination address.

4. The method according to claim 3, wherein the further input comprising a source address.

5. The method according to claim 3, wherein the further input comprising a nonce derived from a current time.

6. The method according to claim 3, wherein the further input comprising a time stamp.

7. The method according to claim 3, wherein the further input comprising a key number identifying the given secret key.

8. The method according to claim 2, further comprising adding error correction bits to the authentication bit sequence dependent on a given error code transformation having as input the authentication bit sequence.

9. The method according to claim 8, wherein the error correction code transformation comprising a Reed-Solomon-Code transformation.

10. The method according to claim 2 wherein the minimum inter-packet time duration being chosen in order to not exceed substantially the order of one second.

11. The method according to claim 2, further comprising embedding the authentication bit sequence in a destination port field and/or in a source port field and/or in an IP-options field of the authentication port scan event packet.

12. The method according to claim 2, with the authentication port scan event packet being a TCP SYN-packet.

13. The method according to one of the previous claim 2, wherein the authentication port scan event packet being a UDP-zero-bit-packet.

14. The method according to claim 2, further comprising:

creating a first authentication bit sequence using a given symmetric secret key;

embedding the first authentication bit sequence in the at least one authentication port scan event packet comprising the given destination address;

broadcasting the at least one authentication port scan event packet;

creating a second authentication bit sequence using a given asymmetric private secret key;

embedding the second authentication bit sequence in the at least one authentication port scan event packet comprising the given destination address;

broadcasting the at least one authentication port scan event packet; and broadcasting further port scan event packets with given port identifiers and the given destination address.

15. A computer program product embodied in a non-transitory tangible medium comprising:

computer readable program codes coupled to the tangible media configured to cause the program to:

create an authentication bit sequence as an output of an authentication transformation, the authentication transformation having as input at least a given destination address and a given secret key;

embed the authentication bit sequence in at least one authentication port scan event packet comprising the given destination address;

broadcast the at least one authentication port scan event packet;

broadcast further port scan event packets with given port identifiers and the given destination address;

broadcast the at least one authentication port scan event packet and/or the further port scan event packets with an inter-packet time duration, being characteristic for the time between two consecutive broadcasts of consecutive port scan event packets, the inter-packet time duration being greater than a given minimum inter-packet time duration; and wherein the minimum inter-packet time duration being chosen in order to not exceed a CPU load of the destination by substantially 10% of the maximum CPU load, when processing the port scan event packets.

16. A port scanning detection method comprising:

deriving a received authentication bit sequence from at least one authentication port scan event packet with identical source addresses;

determining dependent on the received authentication bit sequence and a destination address being comprised in the at least one authentication port scan event packet and a secret key whether an authentication is given;

accepting further port scan event packets with given port identifiers and the given destination address, if the authentication is given; and denying further port scan event packets with given port identifiers and the given destination address or initiating an alarm action, if the authentication is not given;

denying the authentication, if the at least one authentication port scan event packet and/or the further port scan event packets are received with an inter-packet time duration, being characteristic for the time between two consecutive broadcasts of consecutive port scan event packets, the inter-packet time duration being smaller or equal to a given minimum inter-packet time duration; and wherein the minimum inter-packet time duration being chosen not to exceed a CPU load of the destination by approximately 10% of the maximum CPU load, when processing the port scan event packets.

17. The method according to claim 16, further comprising:
creating a reference authentication bit sequence as an output of an authentication transformation, the authentication transformation having as input at least the given destination address and the secret key; and
determining dependent on the received authentication bit sequence and the reference authentication bit sequence whether the authentication is given.

18. The method according to claim 17, further comprising determining whether the authentication is given further dependent on a further input being at least part of at least one of the authentication port scan event packets other than the given destination address.

19. The method according to claim 18, wherein the further input includes a source address.

20. The method according to claim 18, wherein the further input includes a nonce derived from a current time.

21. The method according to claim 18, wherein the further input includes a time stamp.

22. The method according to claim 18, wherein the further input includes a key number identifying the secret key.

23. The method according to claim 18, further comprising adding error correction bits to the authentication bit sequence dependent on a given error code transformation having as input the authentication bit sequence.

24. The method according to claim 23, wherein the error code transformation includes a Reed-Solomon-Code transformation.

25. The method according to claim 16 wherein the minimum inter-packet time duration being chosen not to exceed around the order of one second.

26. The method according to claim 16, further comprising extracting the authentication bit sequence from a destination port field and/or a source port field and/or an IP-options field of the authentication port scan event packet.

27. The method according to claim 16, wherein the authentication port scan event packet being a TCP SYN-packet.

28. The method according to claim 16, wherein the authentication port scan event packet being a UDP-zero-bit-packet.

29. The method according to claim 16, further comprising:
deriving a first received authentication bit sequence from at least one authentication port scan event packet with identical source addresses;
determining dependent on the first received authentication bit sequence and a destination address being comprised in the at least one authentication port scan event packet and a given symmetric secret key whether a first authentication is given;

deriving a second received authentication bit sequence from the at least another one authentication port scan event packet with identical source addresses;
determining dependent on the second received authentication bit sequence and a destination address being comprised in the at least another one authentication port scan event packet and a given asymmetric public secret key whether a second authentication is given;
accepting further port scan event packets with given port identifiers and the given destination address, if the first and second authentication is given; and
otherwise denying further port scan event packets with given port identifiers and the given destination address or initiating an alarm action).

30. A computer program product embodied in a non-transitory tangible medium comprising:
computer readable program codes coupled to the tangible media configured to cause the program to:
derive a received authentication bit sequence from at least one authentication port scan event packet with identical source addresses;
determine dependent on the received authentication bit sequence and a destination address being comprised in the at least one authentication port scan event packet and a secret key whether an authentication is given;
accept further port scan event packets with given port identifiers and the given destination address, if the authentication is given;
deny further port scan event packets with given port identifiers and the given destination address or initiating an alarm action, if the authentication is not given;
deny the authentication, if the at least one authentication port scan event packet and/or the further port scan event packets are received with an inter-packet time duration, being characteristic for the time between two consecutive broadcasts of consecutive port scan event packets, the inter-packet time duration being smaller or equal to a given minimum inter-packet time duration; and
wherein the minimum inter-packet time duration being chosen not to exceed a CPU load of the destination by approximately 10% of the maximum CPU load, when processing the port scan event packets.

31. A port scanning device comprising at least one computer processor configured to:
create an authentication bit sequence as an output of an authentication transformation, the authentication transformation having as input at least a given destination address and a given secret key;
embed the authentication bit sequence in at least one authentication port scan event packet comprising the given destination address;
broadcast the at least one authentication port scan event packet;
broadcast further port scan event packets with given port identifiers and the given destination address;
derive a received authentication bit sequence from at least one authentication port scan event packet with identical source addresses;
determine whether authentication is given based on the received authentication bit sequence and a destination address being comprised in the at least one authentication port scan event packet and a secret key;
accept further port scan event packets with given port identifiers and the given destination address, if the authentication is given;

deny further port scan event packets with given port identifiers and the given destination address or initiating an alarm action, if the authentication is not given;

denying the authentication, if the at least one authentication port scan event packet and/or the further port scan event packets are received with an inter-packet time duration, being characteristic for the time between two consecutive broadcasts of consecutive port scan event packets, the inter-packet time duration being smaller or equal to a given minimum inter-packet time duration; and wherein the minimum inter-packet time duration being chosen not to exceed a CPU load of the destination by approximately 10% of the maximum CPU load, when processing the port scan event packets.

* * * * *